(12) United States Patent
Joos et al.

(10) Patent No.: US 12,272,847 B2
(45) Date of Patent: *Apr. 8, 2025

(54) SYSTEM AND METHOD FOR CONTROLLING VOLTAGE OF FUEL CELL

(71) Applicant: HYDROGENICS CORPORATION, Mississauga (CA)

(72) Inventors: Nathaniel Ian Joos, Toronto (CA); Paolo Forte, Maple (CA)

(73) Assignee: HYDROGENICS CORPORATION, Mississauga (CA)

( * ) Notice: Subject to any disclaimer, the term of this patent is extended or adjusted under 35 U.S.C. 154(b) by 307 days.

This patent is subject to a terminal disclaimer.

(21) Appl. No.: 17/953,153

(22) Filed: Sep. 26, 2022

(65) Prior Publication Data
US 2023/0061237 A1 Mar. 2, 2023

Related U.S. Application Data

(60) Continuation of application No. 16/884,453, filed on May 27, 2020, now Pat. No. 11,456,470, which is a
(Continued)

(51) Int. Cl.
*H01M 8/04858* (2016.01)
*H01M 8/04089* (2016.01)
(Continued)

(52) U.S. Cl.
CPC ..... *H01M 8/0488* (2013.01); *H01M 8/04097* (2013.01); *H01M 8/04559* (2013.01);
(Continued)

(58) Field of Classification Search
CPC ............. H01M 8/0488; H01M 8/0497; H01M 8/04559; H01M 8/04753; H01M 8/04761; H01M 16/006; H01M 8/04365
See application file for complete search history.

(56) References Cited

U.S. PATENT DOCUMENTS 4,362,789 A 12/1982 Dighe et al.
6,979,508 B2 12/2005 Gurin et al.
(Continued)

FOREIGN PATENT DOCUMENTS

CA 2812257 4/2004
CN 1790794 6/2006
(Continued)

OTHER PUBLICATIONS

Wikipedia—Series and parallel circuits https://en.wikipedia.org/wiki/Series_and_parallel_circuits (Year: 2024).*
(Continued)

*Primary Examiner* — Eugenia Wang
(74) *Attorney, Agent, or Firm* — Barnes & Thornburg LLP

(57) ABSTRACT

This specification describes a system and method for controlling the voltage produced by a fuel cell. The system involves providing a bypass line between an air exhaust from the fuel cell and an air inlet of the fuel cell. At least one controllable device is configured to allow the flow rate through the bypass line to be altered. A controller is provided to control the controllable device. The method involves varying the rate of recirculation of air exhaust to air inlet so as to provide a desired change in fuel cell voltage.

19 Claims, 1 Drawing Sheet

Figure 1:
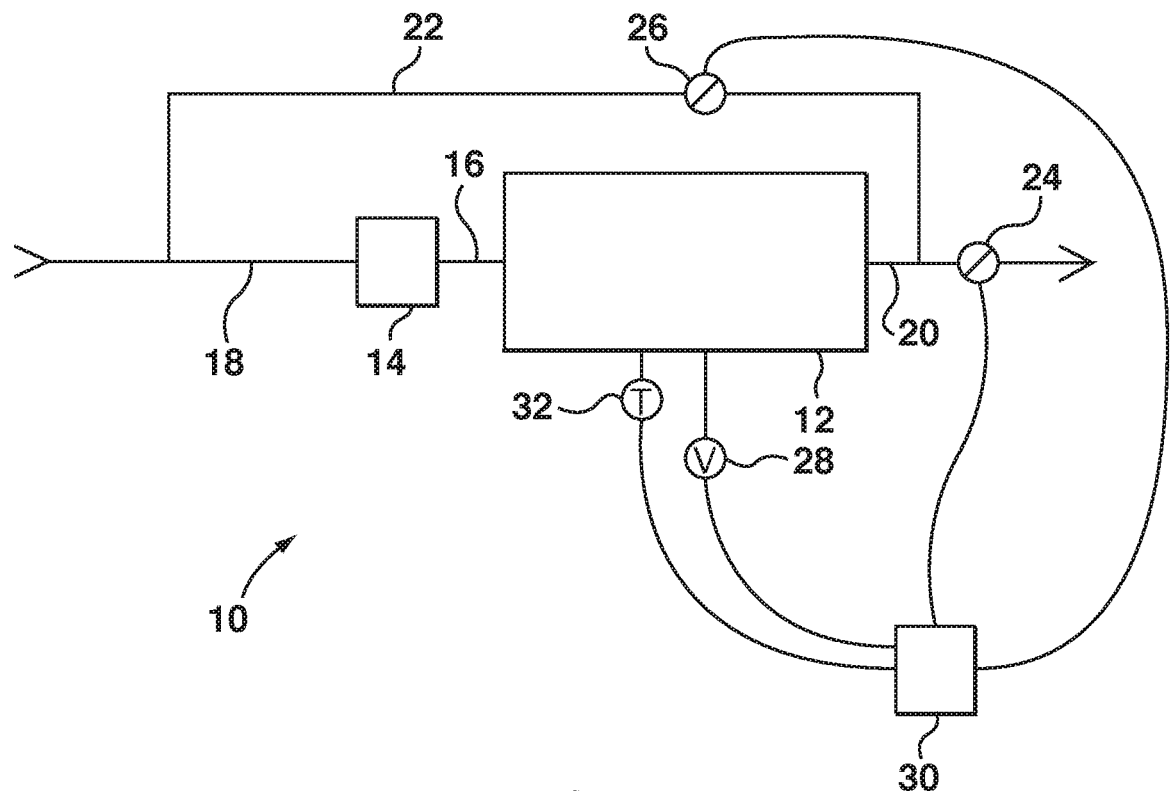

Related U.S. Application Data division of application No. 14/892,888, filed as application No. PCT/CA2014/050175 on Mar. 6, 2014, now Pat. No. 10,985,392.

(60) Provisional application No. 61/827,318, filed on May 24, 2013.

(51) Int. Cl.
  H01M 8/04537 (2016.01)
  H01M 8/04746 (2016.01)
  H01M 16/00 (2006.01)
  H01M 8/0432 (2016.01)

(52) U.S. Cl.
  CPC ..... H01M 8/04753 (2013.01); H01M 16/006 (2013.01); H01M 8/04365 (2013.01); H01M 8/04761 (2013.01)

(56) References Cited

U.S. PATENT DOCUMENTS

| | | | |
|---|---|---|---|
| 7,758,988 | B2 | 7/2010 | Keefer et al. |
| 2002/0136939 | A1 | 9/2002 | Grieve et al. |
| 2003/0113594 | A1 | 6/2003 | Pearson et al. |
| 2003/0186093 | A1 | 10/2003 | St. Pierre et al. |
| 2004/0110047 | A1* | 6/2004 | Hwang ............. H01M 8/04395 429/432 |
| 2005/0058860 | A1 | 3/2005 | Goebel et al. |
| 2005/0123813 | A1* | 6/2005 | Matoba ............. H01M 8/04097 429/442 |
| 2007/0269695 | A1 | 11/2007 | Yamazaki et al. |
| 2008/0070078 | A1 | 3/2008 | Gummala et al. |
| 2008/0187785 | A1 | 8/2008 | Kwok et al. |
| 2008/0213634 | A1 | 9/2008 | Grundel et al. |
| 2010/0297518 | A1 | 11/2010 | Wake et al. |
| 2010/0310955 | A1 | 12/2010 | Yadha et al. |
| 2011/0045368 | A1 | 2/2011 | Knoop et al. |
| 2011/0111318 | A1 | 5/2011 | Bernard et al. |
| 2012/0082912 | A1 | 4/2012 | Hyde et al. |
| 2012/0210747 | A1 | 8/2012 | Hoffjann et al. |
| 2012/0292058 | A1 | 11/2012 | Bleil et al. |
| 2014/0203636 | A1 | 7/2014 | Goetz et al. |

FOREIGN PATENT DOCUMENTS

| | | |
|---|---|---|
| CN | 1326276 | 7/2007 |
| DE | 102011083453 | 3/2013 |
| EP | 0136187 | 4/1985 |
| WO | 2013045139 | 4/2013 |

OTHER PUBLICATIONS

Keim et al., "Multifunctional Fuel Cell System in an Aircraft Environment: An Investigation Focusing on Fuel Tank Inerting and Water Generation," Aerospace Science and Technology, Apr. 2013, vol. 29, pp. 330-338.
Canadian Patent Application No. 2,913,553, Office Action dated Jun. 12, 2020.
Canadian Patent Application No. 2,913,376, Office Action dated Apr. 21, 2020.
Chinese Patent Application No. 201480036214, Office Action dated May 4, 2017—English Translation available.
European Patent Application No. 14801196.8, Communication pursuant to Article 94(3) EPC dated Jul. 27, 2017.
European Patent Application No. 140801196.8, Supplementary European Search Report dated Sep. 23, 2016.
International Patent Application No. PCT/CA2014/050175, International Preliminary Report on Patentability dated Dec. 3, 2015.
International Patent Application No. PCT/CA2014/050175, International Search Report and Written Opinion dated May 13, 2014.

* cited by examiner

SYSTEM AND METHOD FOR CONTROLLING VOLTAGE OF FUEL CELL

CROSS-REFERENCE TO RELATED APPLICATIONS

This application is a continuation of U.S. application Ser. No. 16/884,453, filed on May 27, 2020, which is a divisional of U.S. application Ser. No. 14/892,888, filed on Nov. 20, 2015, which is a National Stage Entry of International Application No. PCT/CA2014/050175, filed on Mar. 6, 2014, which is a non-provisional application of U.S. Application Ser. No. 61/827,318, filed on May 24, 2014, all of which are incorporated herein in their entireties by reference.

FIELD

This specification relates to fuel cell power systems.

BACKGROUND

A fuel cell produces voltage according to a polarisation curve. The polarisation curve describes the fuel cell voltage as a function of the fuel cell current or the fuel cell current density. In general, as current supplied by the fuel cell increases from zero, the fuel cell voltage initially drops rapidly through an activation region, then drops nearly linearly through an ohmic region, then drops more rapidly through a mass transport region. In many cases, it would be desirable to alter the polarisation curve of the fuel cell.

INTRODUCTION

This specification describes a system and method for controlling the voltage produced by a fuel cell. The system involves providing a recirculation line between an air exhaust from the fuel cell and an air inlet of the fuel cell. At least one controllable device is configured to allow the flow rate through the recirculation line to be altered. A controller is provided to control the controllable device. The method involves varying the rate of recirculation of air exhaust to air inlet so as to provide a desired change in fuel cell voltage.

FIGURES

Figure 2:
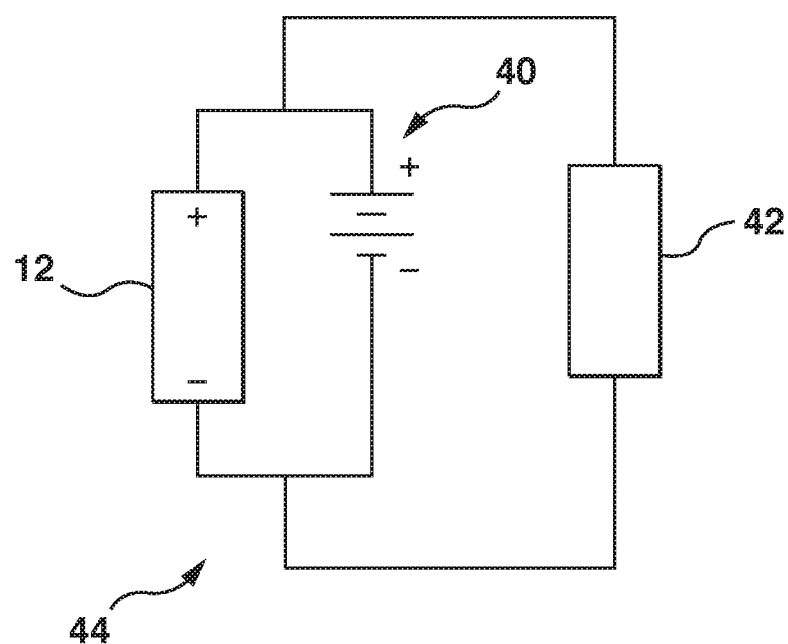

FIG. 1 is a schematic drawing of a fuel cell power system.
FIG. 2 is a schematic drawing of the fuel cell power system of FIG. 1 wired in parallel with a battery and connected to a load.

DETAILED DESCRIPTION

FIG. 1 shows a fuel cell power system 10, alternatively call a fuel cell power module. The system 10 includes a fuel cell stack 12, an air blower 14, an air inlet line 16, a blower inlet line 18, an air outlet line 20, a recirculation line 22 (alternatively called a bypass line), an exhaust valve 24, a recirculation valve 26 (alternatively called a bypass valve), a voltage sensor 28, a controller 30 and a temperature sensor 32. The system 10 also contains several other conventional elements, such as a hydrogen supply, that are not shown in FIG. 1 to allow the more material elements of the system 10 to be emphasized. The configuration of the elements in system 10 may be altered. For example, there might be only one of the exhaust valve 24 and recirculation valve 26. In another example, an equivalent system might be arranged with the air blower 14 attached to the air outlet line 20.

In operation, hydrogen and air flow through the fuel cell stack 12. Some or all of the hydrogen is consumed by reacting with oxygen from the air in the fuel cell stack. An excess of air, relative to the amount of air that would carry a stoichiometric amount of oxygen to react with the hydrogen, flows through the fuel cell stack 12. The excess air serves to remove moisture from the fuel cell stack and to help ensure that local areas within the fuel cell stack are not starved of oxygen. The amount of excess air, measured at the inlet, is typically in the range of 1.5 to 3 times the amount of air that would carry a stoichiometric amount of oxygen. For brevity, this excess amount of air will be described as "N times the stoichiometric amount".

In some cases, the voltage produced by the fuel cell is not particularly important. However, in other cases, the variation of voltage with current according to the polarisation curve causes problems. For example, as shown in FIG. 2, a fuel cell stack 12 is often connected in parallel with a battery 40 to provide a hybrid electrical power supply system 44. As current drawn from the hybrid system 44 by a load 42 changes, the difference in the polarisation curves of the battery and the fuel cell can cause either the battery 40 or the fuel cell stack 12 to over-contribute to the total power demand. Either the battery 40 or the fuel cell stack 12 may overheat. Therefore, it would be desirable to be able to cause the fuel cell stack 12 to operate as if it had a polarisation curve more nearly like that of the battery 40. In other cases, a device powered by a fuel cell has characteristics that would make a particular polarisation curve desirable. In some cases, it would be desirable to have a more nearly flat polarisation curve. In other cases, it would be desirable for the slope of the polarisation curve in the ohmic region to more nearly constant or to extend further into the activation region. In these cases, creating the desired voltage output is sometimes achieved by using a DC to DC voltage converter.

In the system 10, air can be permitted to flow through the recirculation line 22 by opening recirculation valve 26. With recirculation valve 26 at least partially open, the difference in pressure between the air outlet line 20 and the suction side of air blower 14 causes flow in the recirculation line 22. The flow through recirculation line 22 can be increased by opening recirculation valve 26 or decreased by closing recirculation valve 26. When the recirculation valve 26 is at least partially open, closing exhaust valve 24 increases flow in the recirculation line 22 and opening exhaust valve 24 decreases flow in the recirculation line 22. Accordingly, one or both of exhaust valve 24 and recirculation valve 26 can be modulated to vary the flow rate in the recirculation line 22. Although modulating valves 24, 26 may affect the total head loss incurred by blowing air through the fuel cell stack 12, and therefore the total flow rate of air through the fuel cell stack 12, the change in total flow rate is small and not of primary importance to the process. The more important result of modulating one or more of valves 24, 26 is that the partial pressure of oxygen in the air side of the fuel cell stack 12 can be altered. This effect will be illustrated in the example below.

Ambient air has about 20.9% oxygen. To simplify the following discussion, it will be assumed that ambient air is 20% oxygen and 80% nitrogen and all percentages in the following sentences will be proportion to these amounts in ambient air. If ambient air is provided to the fuel cell stack 12 at 3 times the stoichiometric amount, then the incoming air has a total flow rate of 300% consisting of 60% oxygen and 240% nitrogen. One stoichiometric amount of oxygen, or 20%, is consumed by hydrogen as the air passes through the fuel cell stack 12. The exhaust gas produced has a flow rate of 280% made up of 40% oxygen and 240% nitrogen. The ratio of oxygen to total gas in the exhaust gas is now 1:7 rather than 1:5 for the ambient air. If some or all of the exhaust gas passes through the fuel cell stack again, even lower ratios of oxygen to total gas are achieved although partially attenuated by the need to provide make-up air. Systems that operate at lower total air flow rates relative to the stoichiometric amount can achieve even greater variation in oxygen to total gas ratio.

Modulating one or more of valves 24 and 26 controls the relative amounts of exhaust gas and ambient air that flow through the fuel cell stack 12. This in turn controls the ratio of oxygen to total gas in the air side of the fuel cell stack. This ratio in turn causes a change in partial pressure of oxygen in the air side of the fuel cell stack. The voltage of the fuel stack 12 varies more with the partial pressure of oxygen than with the total gas flow. A higher oxygen partial pressure produces a higher voltage at a given current output while a lower oxygen partial pressure produces a lower voltage at a given current output. Generally speaking, changing the partial pressure of oxygen changes the shape of the polarisation curve. Despite the change in partial pressure, total gas flow rate through the fuel cell stack remains at or above the minimum rate chosen for water removal. Further, provided that the amount of oxygen in the exhaust/ambient air blend does not result in a flow of oxygen less than one stoichiometric amount, the high total gas flow rate helps deliver enough oxygen to all parts of the fuel cell stack 12.

To enable real time control, one or both of the valves 24 and 26 are connected to a controller 30. The controller 30 may be programmed to modulate one or both of the valves 24 and 26 in a pre-programmed manner based on a stored formula or table giving the valve movements predicted to give a voltage desired under different operating conditions. Optionally, the controller 30 is connected to a voltage sensor 28 connected to the fuel cell stack 12 to allow for a feedback loop to allow one or both of the valves 24 and 26 to be trimmed in response to a variance between desired and actual voltage. Further optionally, the controller 32 may be connected to a temperature sensor 32 to provide an emergency avoidance feature. If the fuel cell stack 12 is in danger of overheating, the controller 30 can module one or both of the valves 24 and 26 to reduce the cell stack voltage.

Alternatively, the controller 30 may be part of, or connected to, a larger system. In this case, a desire for a change in the fuel cell voltage can be determined by any part of the larger system. For example, if the fuel cell stack 12 is connected in parallel with a battery, the battery voltage can be communicated to the controller 30 which then modulates one or more of the valves 24 and 26 to more nearly match the voltage of the battery, to move towards the voltage of the battery, or to be within a range relative to the voltage of the battery. In this case, the voltage sensor 28 can still be used to provide an inner control loop operating inside of the outer control loop of the larger system.

References to a battery above include a bank or other assembly of batteries connected wired in parallel or in some combination of series and parallel with the fuel cell stack 12. Similarly, a system 10 may have multiple fuel cell stacks 12, or multiple systems 10 may be assembled into a bank or other structure and then connected to one or more batteries. In this case, one or more than one of the fuel cell stacks 12 or systems 10 may be controlled to control the voltage of the assembly as a whole to more nearly match the voltage of one or more batteries connected in parallel. The method and apparatus described herein can also be used when connecting a fuel cell power system 10 to a load without a battery, for example directly or through a DC-DC voltage converter. The method and apparatus can help keep the voltage of the fuel cell power system 10 within a range required by the load, for example computer servers or other electronic equipment, for example in a DC grid data center.

We claim:
1. A method comprising,
  a) providing a fuel cell stack having an air inlet, an air exhaust, and a recirculation line between the air exhaust from the fuel cell stack and the air inlet of the fuel cell stack, the fuel cell stack configured to connect to a load;
  b) providing a battery configured to connect to the load;
  c) recirculating a portion of air exhausted through the air exhaust to the air inlet though the recirculation line;
  d) controlling a valve configured to adjust a rate of air flow through the recirculation line; and
  e) adjusting the valve so that a voltage output by the fuel cell stack is within a range of a voltage output by the battery, wherein the step of adjusting includes adjusting the valve so that the voltage output by the fuel cell stack more nearly matches the voltage output by the battery.

2. The method of claim 1, further comprising polling a voltage sensor connected to the fuel cell stack.

3. The method of claim 2, further comprising comparing the voltage detected by the voltage sensor to the voltage output by the battery.

4. The method of claim 1, wherein the battery is connected in parallel with the fuel cell stack.

5. The method of claim 1, wherein the valve is a recirculation valve on the recirculation line, and wherein the method further comprises providing an exhaust valve.

6. The method of claim 5, further comprising at least partially opening the recirculation valve so that the rate of air flow through the recirculation line is increased.

7. The method of claim 6, further comprising closing the exhaust valve so that the rate of air flow through the recirculation line is increased.

8. The method of claim 1, further comprising connecting the fuel cell stack to a temperature sensor and adjusting the valve in response to a temperature of the fuel cell stack detected by the temperature sensor being indicative of overheating of the fuel cell stack.

9. The method of claim 1, further comprising determining the voltage output by the battery and, based on the voltage output by the battery, adjusting the valve so that the voltage output by the fuel cell stack is within the range of the voltage output by the battery.

10. The method of claim 1, wherein the adjustment of the rate of air flow is based on a stored formula or table giving adjustments predicted to produce a desired voltage under different operating conditions.

11. A method comprising:
  a) providing a fuel cell stack having an air inlet, an air exhaust, and a recirculation line between the air exhaust from the fuel cell stack and the air inlet of the fuel cell stack, the fuel cell stack configured to connect to a load;
  b) providing a battery configured to connect in parallel to the load;
  c) recirculating a portion of air exhausted through the air exhaust to the air inlet though the recirculation line;

d) adjusting a rate of air flow through the recirculation line so that a voltage output by the fuel cell stack is within a range of a voltage output by the battery, and e) determining the voltage output by the battery and, based on the voltage output by the battery, adjusting the rate of air flow so that the voltage output by the fuel cell stack is within the range of the voltage output by the battery.

12. The method of claim 11, wherein the step of adjusting the rate of air flow includes modulating a valve configured to adjust the rate of air flow through the recirculation line.

13. The method of claim 12, wherein the valve is a recirculation valve on the recirculation line, and wherein the method further comprises providing an exhaust valve.

14. The method of claim 13, further comprising at least partially opening the recirculation valve so that the rate of air flow through the recirculation line is increased.

15. The method of claim 14, further comprising closing the exhaust valve so that the rate of air flow through the recirculation line is increased.

16. The method of claim 11, wherein step (e) includes adjusting the rate of air flow so that the voltage output by the fuel cell stack more nearly matches the voltage output by the battery.

17. The method of claim 11, further comprising polling a voltage sensor connected to the fuel cell stack and comparing the voltage detected by the voltage sensor to the voltage output by the battery.

18. The method of claim 11, wherein the adjustment of the rate of air flow is based on a stored formula or table giving adjustments predicted to produce a desired voltage under different operating conditions.

19. The method of claim 11, further comprising connecting the fuel cell stack to a temperature sensor and adjusting the rate of air flow in response to a temperature of the fuel cell stack detected by the temperature sensor being indicative of overheating of the fuel cell stack.

* * * * *